(12) United States Patent
De Voss et al.

(10) Patent No.: US 6,488,337 B1
(45) Date of Patent: Dec. 3, 2002

(54) SEAT CUSHION HEIGHT ADJUSTMENT ASSEMBLY

(75) Inventors: Catherine A. De Voss, Plymouth, MI (US); Peter P. Zeimis, III, Shelby Township, MI (US); Stephen P. Tokarz, New Boston, MI (US); Michael P. Modreski, Whitelake, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/807,308

(22) PCT Filed: Oct. 13, 1999

(86) PCT No.: PCT/CA99/00961

§ 371 (c)(1),
(2), (4) Date: Jun. 11, 2001

(87) PCT Pub. No.: WO00/21779

PCT Pub. Date: Apr. 20, 2000

Related U.S. Application Data

(60) Provisional application No. 60/103,980, filed on Oct. 13, 1998.

(51) Int. Cl.[7] .............................. B60N 2/12; F16M 13/00
(52) U.S. Cl. ............................ 297/344.13; 297/344.15; 248/419; 248/421
(58) Field of Search .................. 297/344.13, 344.15; 248/419, 421

(56) References Cited

U.S. PATENT DOCUMENTS

| | | | | |
|---|---|---|---|---|
| 4,653,807 A | | 3/1987 | Hirose et al. | 248/430 X |
| 4,765,582 A | * | 8/1988 | Babbs | 297/344.13 X |
| 4,948,081 A | * | 8/1990 | Hatta | 248/421 X |
| 4,993,678 A | * | 2/1991 | Easter | 248/421 X |
| 5,123,622 A | | 6/1992 | Matsumoto et al. | 248/421 |
| 5,486,036 A | | 1/1996 | Ito et al. | |
| 5,626,395 A | * | 5/1997 | Aufrere | 297/344.15 X |
| 5,676,424 A | * | 10/1997 | Winkelhake | 297/344.13 X |

(List continued on next page.)

FOREIGN PATENT DOCUMENTS

| | | |
|---|---|---|
| EP | 0 235 793 B1 | 3/1987 |
| GB | 2 303 059 A | 12/1997 |

*Primary Examiner*—Rodney B. White
(74) *Attorney, Agent, or Firm*—Clark Hill PLC

(57) ABSTRACT

An automotive seat adjustment assembly adjusts a relative position of a seat cushion. The adjustment assembly comprises at least one front mounting bracket adapted for supporting a forward end of the seat cushion and at least one rear mounting bracket adapted fort supporting a rearward end of the seat cushion. At least one front seat support is movably mounted to the front mounting bracket and adapted for mounting to the forward end of the seat cushion. The front seat support is movable between a first position with the seat cushion in a lowered orientation and a second position with the seat cushion in a raised orientation. At least one rear seat support movably mounted to the rear mounting bracket and adapted for mounting to the rearward end of the seat cushion. The rear support is movable between a first position with the seat cushion in a lowered orientation and a second position with the seat cushion in a raised orientation. At least one drive plate interconnecting one of the front and rear mounting brackets with a corresponding front and rear support. A drive arm having first and second ends, the first end mounted to the drive plate and is movable between actuated and non-actuated positions for moving the corresponding front and rear seat support between the first and second positions to move the seat cushion between the lowered and raised orientations. A cam connected to the second end of the drive arm for selectively moving the drive arm between the actuated and non-actuated positions to move the front and rear supports and the seat cushion.

17 Claims, 5 Drawing Sheets

U.S. PATENT DOCUMENTS

| | | | |
|---|---|---|---|
| 5,765,840 A | | 6/1998 | Tame ..................... 248/419 X |
| 5,772,283 A | * | 6/1998 | Yoshida et al. ......... 248/421 X |
| 5,882,061 A | * | 3/1999 | Guillouet ........... 297/344.15 X |
| 6,264,275 B1 | * | 7/2001 | Frohnhaus et al. . 297/344.13 X |
| 6,276,650 B1 | * | 8/2001 | Kojima et al. .......... 248/421 X |
| 6,290,198 B1 | * | 9/2001 | Kojima et al. ...... 297/344.15 X |

* cited by examiner

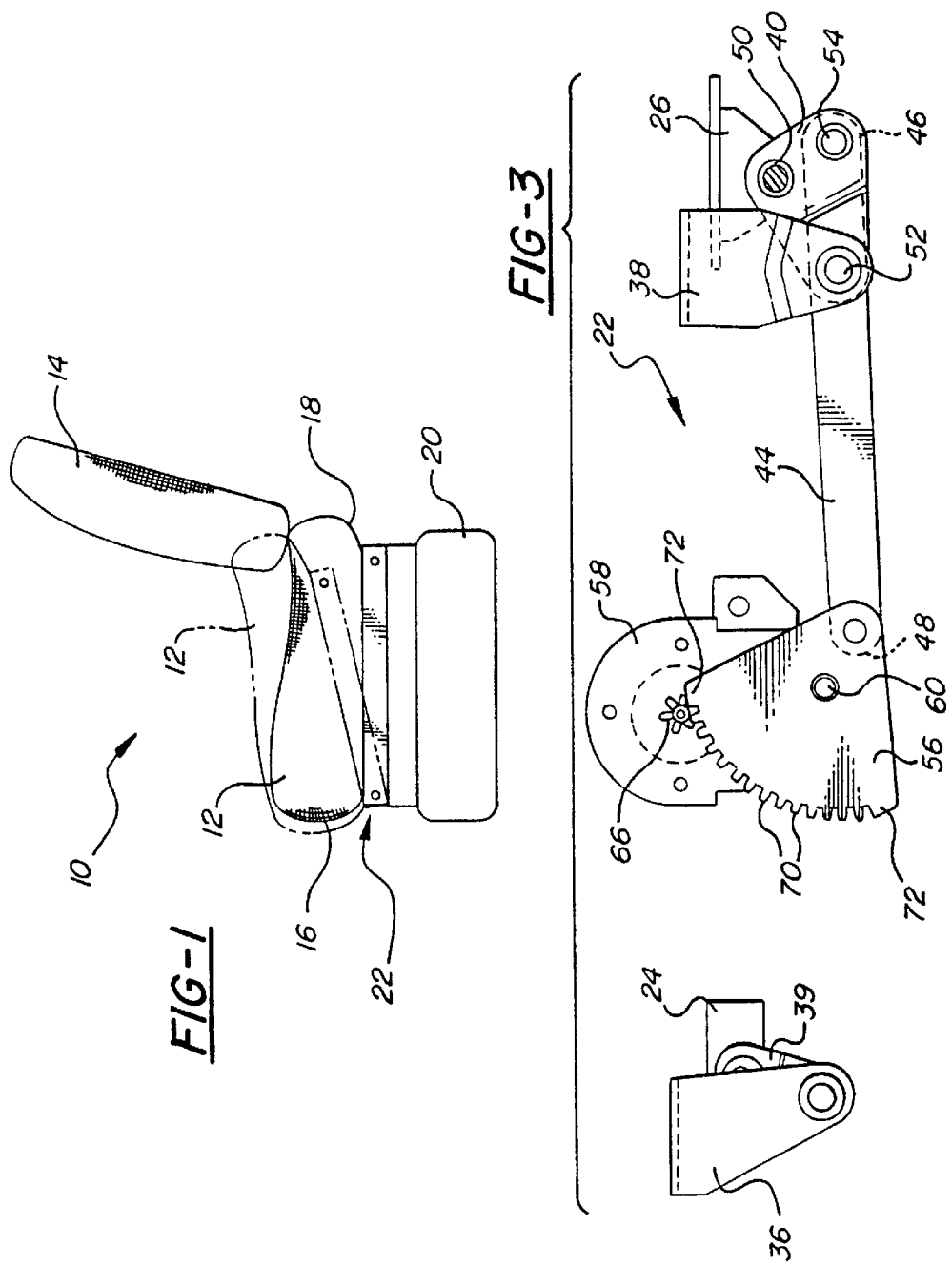

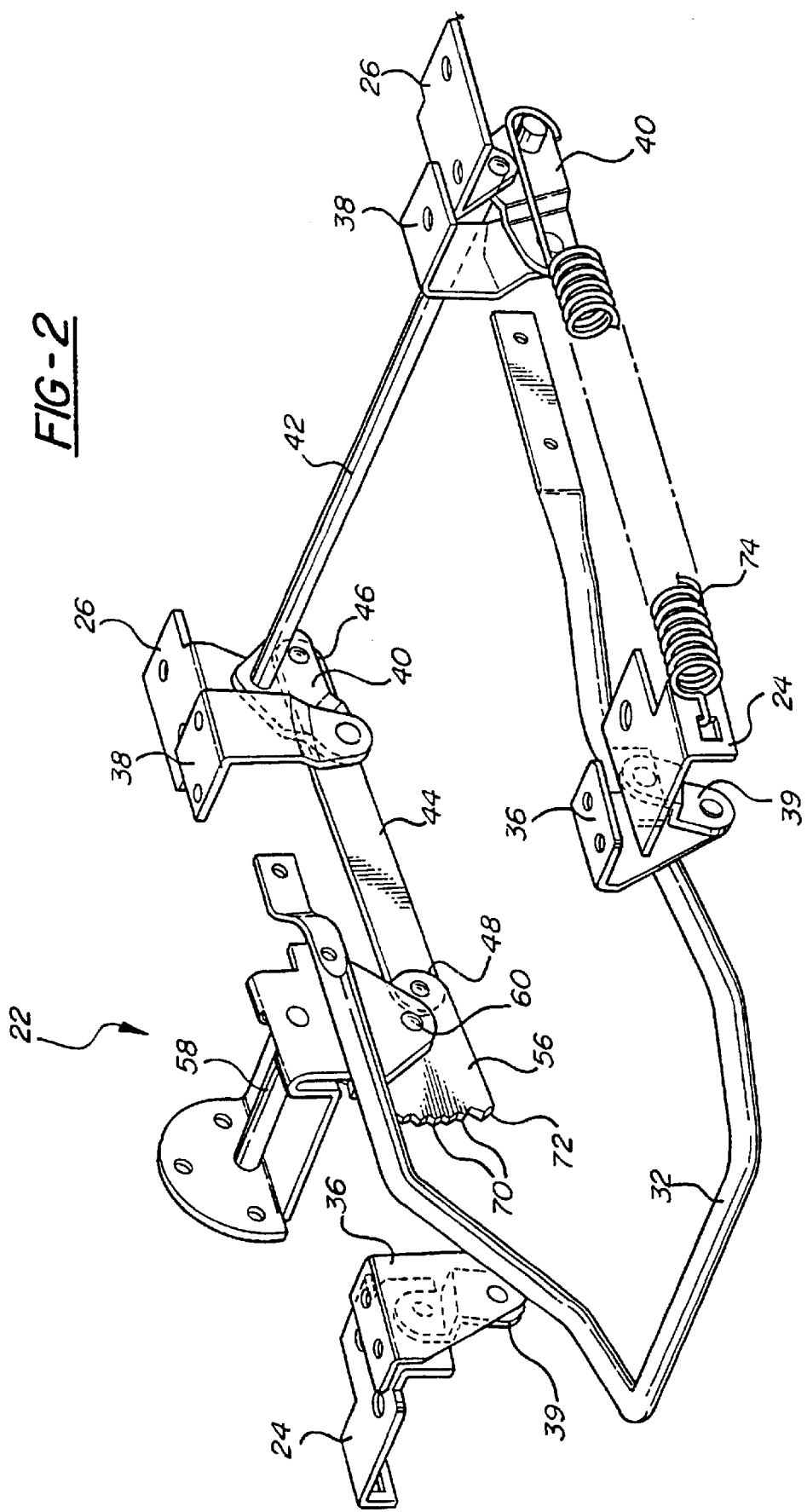

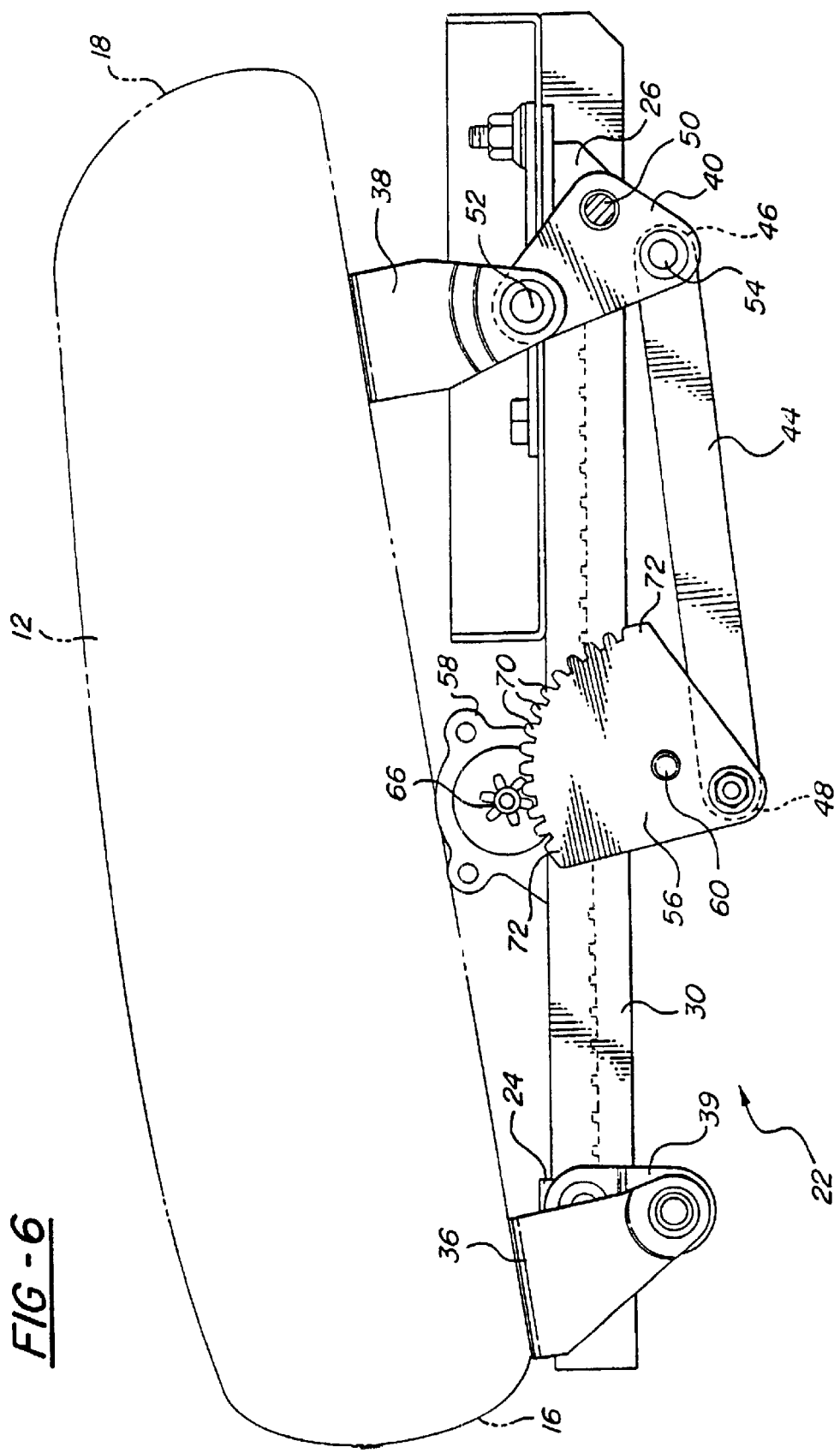

SEAT CUSHION HEIGHT ADJUSTMENT ASSEMBLY

This application claims the benefit of Provisional application No. 60/103,980, filed Oct. 13, 1998.

FIELD OF THE INVENTION

The subject invention relates to a seat adjustment assembly for adjusting the height of a seat cushion.

DESCRIPTION OF THE PRIOR ART

Automotive seats include a number of adjustment devices for adjusting a relative position of the seat to a passengers particular comfort needs. The adjustment devices typically include manual and/or power mechanisms which recline a seat back, move the seat cushion for and aft, raise or lower the seat cushion, tilt the seat cushion, adjust a lumbar support and/or adjust the relative position of a headrest.

There are numerous devices which raise, lower and tilt the seat cushion which have been contemplated by the prior art. Examples of such devices are disclosed in U.S. Pat. Nos. 4,653,807, 5,123,622 and 5,765,840 and in British Patent No. 2 303 059. The prior art devices incorporate complicated linking mechanisms, cables, servos, ratchet and pawls and other components. In addition, many of the prior art devices incorporate added parts to ensure a desired range of lifting or tilting motion and to ensure the raised seat cushion can support the weight of the passenger.

There is a need for a seat cushion adjustment mechanism which is of a relatively simple design and utilizes a minimum number of parts while still ensuring a proper range of motion and being able to support the weight of a passenger.

SUMMARY OF THE INVENTION

An automotive seat adjustment assembly adjusts a relative position of a seat cushion. The adjustment assembly comprises at least one front mounting bracket adapted for supporting a forward end of the seat cushion and at least one rear mounting bracket adapted for supporting a rearward end of the seat cushion. At least one front seat support is movably mounted to the front mounting bracket and adapted for mounting to the forward end of the seat cushion. The front seat support is movable between a first position with the seat cushion in a lowered orientation and a second position with the seat cushion in a raised orientation. At least one rear seat support is movably mounted to the rear mounting bracket and adapted for mounting to the rearward end of the seat cushion. The rear seat support is movable between a first position with the seat cushion in a lowered orientation and a second position with the seat cushion in a raised orientation. At least one drive plate interconnects one of the front and rear mounting brackets with a corresponding front and rear seat support. A drive arm, having first and second ends, has the first end mounted to the drive plate and is movable between actuated and non-actuated positions for moving the corresponding front and rear seat support between the first and second positions to move the seat cushion between the lowered and raised orientations. A cam is connected to the second end of the drive arm for selectively moving the drive arm between the actuated and non-actuated positions to move the front and rear seat supports and the seat cushion.

Accordingly, the subject invention is of a relatively simple design essentially comprising a set of links for the forward and rearward ends of the seat cushion in order to move either or both ends of the seat cushion. The adjustment assembly of the subject invention does not incorporate any additional parts in order to limit the range of movement or for supporting the entire weight of a passenger.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of an automotive seat incorporating a seat adjustment assembly in accordance with the subject invention;

FIG. 2 is a perspective view of the adjustment assembly;

FIG. 3 is a partially cross-sectional side view of the adjustment assembly;

FIG. 6 is a partially cross-sectional side view of the adjustment assembly mounted to the seat track with the adjustment assembly in a raised position.

DETAILED DESCRIPTION OF THE PREFERRED EMBODIMENT

Figure 4:
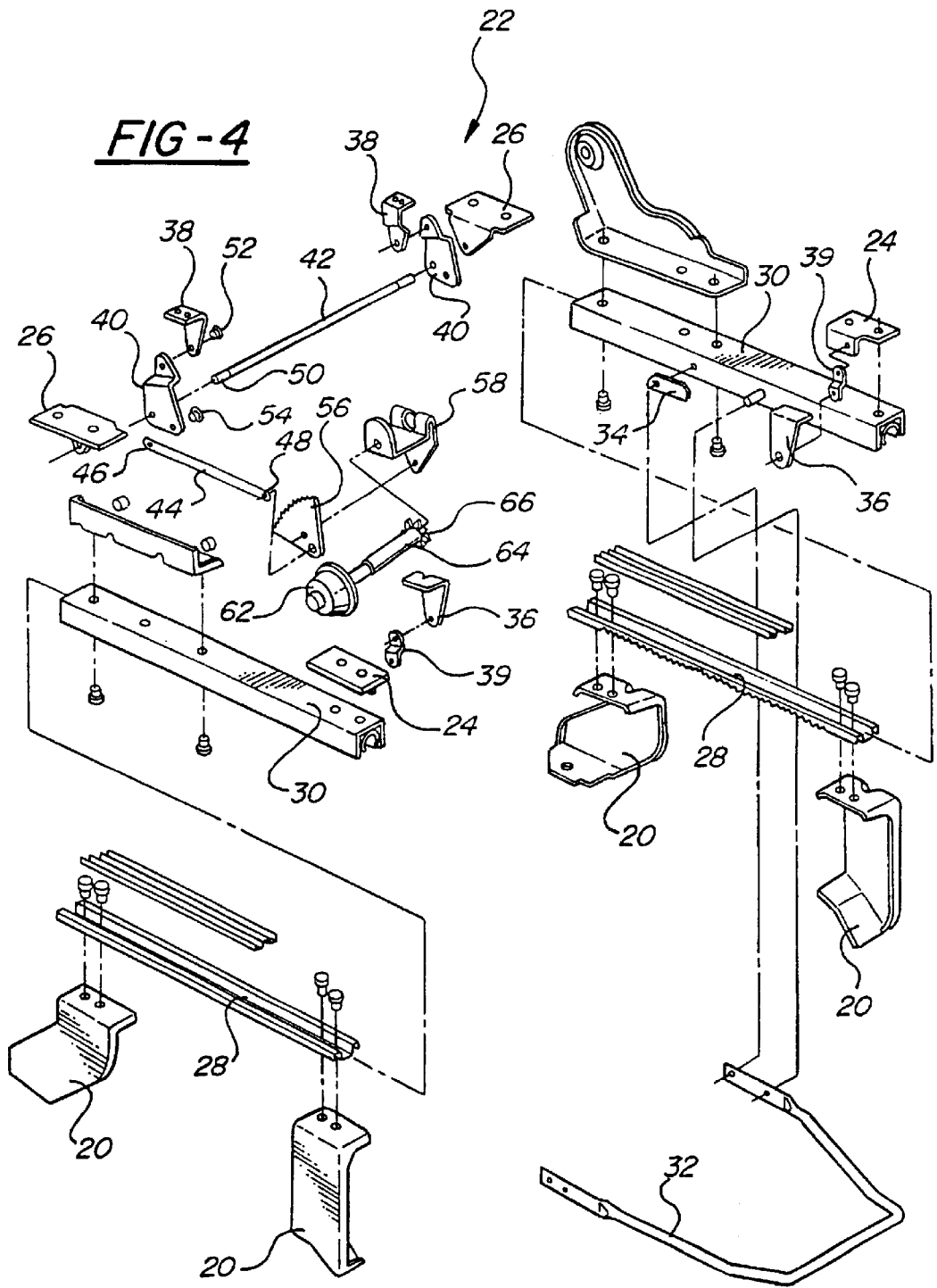
FIG. 4 is an exploded view of the adjustment assembly along with other related components of the seat.

Referring to the Figures, wherein like numerals indicate like or corresponding parts throughout the several views, an automotive seat is generally shown at 10 in FIG. 1.

The seat 10 includes a seat cushion 12 and a seat back 14 pivotally mounted to the seat cushion 12. The seat cushion 12 has a forward end 16 and a rearward end 18 and is formed of a number of known components (not shown) such as a seat pan, foam pad, and trim cover material. The seat cushion 12 is mounted to a seat riser 20 as is well known in the art.

The seat cushion 12 of the subject invention includes a seat adjustment assembly, generally shown at 22, which is shown schematically in FIG. 1. The adjustment assembly 22 is adapted for adjusting a relative position of the seat cushion 12, independently from the seat back 14, between a lowered position and a raised position. As shown in the Figures only the rearward end 18 of the seat cushion 12 is lifted to the raised position. As appreciated and discussed below, the forward end 16 of the seat cushion 12 may also be lifted upward in conjunction with or independently of the rearward end 18. It is desirable to lift either the forward 16 and/or rearward 18 ends of the seat cushion 12 for a number of reasons. For example, lifting the rearward end 18 can move a passenger forward, lifting the forward end 16 can move the passenger backward, lifting both the forward 16 and rear 18 ends can elevate the passenger, and combinations thereof can tilt the passenger as desired. Hence, the seat cushion 12 can be adjusted to maintain the optimum seating position of the passenger.

Referring to FIGS. 2 through 6, the details of the adjustment assembly 22 are now discussed in greater detail. The adjustment assembly 22 comprises at least one front mounting bracket 24 adapted for supporting the forward end 16 of the seat cushion 12 and at least one rear mounting bracket 26 adapted for supporting the rearward end 18 of the seat cushion 12. In the preferred embodiment, the at least one front mounting bracket 24 includes a pair of front mounting brackets 24 and the at least one rear mounting bracket 26 includes a pair of rear mounting brackets 26.

As best shown in FIG. 4, the pairs of front 24 and rear 26 mounting brackets are secured to opposing sides of the seat cushion 12 in order to adequately support the seat cushion 12. In addition, the pairs of front 24 and rear 26 mounting brackets are adequately spaced from each other so as to mount to the forward end 16 and rearward end 18 of the seat cushion 12, respectively. Preferably, the front 24 and rear 26 mounting brackets are riveted or otherwise fixedly secured to a seat track mechanism 28, 30 which is in turn mounted to the seat riser 20. The seat track mechanism 28, 30 may be of any suitable design and may have manual or power adjustment as is known in the seat track art. Seat track mechanisms 28, 30 of this type include a lower track member 28 and an upper track member 30 slideably disposed on the lower track member 28. An incremental adjustment bar 32 is connected to a locking pawl 34 which is disposed between the upper 30 and lower 28 track members. The locking pawl 34 secures the upper track member 30 to the lower track member 28 to anchor the seat 10 into a fixed position. To move the seat 10 fore and aft, the passenger actuates the adjustment bar 32 which moves the locking pawl 34 out of locking engagement and releases the upper track member 30 from the lower track member 28. This type of adjustment including the associated components is well known in the seat track art and does not form a part of the claimed invention.

Typically, the seat pan of the seat cushion 12 is fixedly mounted to the upper track member 30 of the seat track 28, 30. The seat pan is usually formed of a metal or rigid plastic and forms the bottom portion of the seat cushion 12 itself. The seat cushion 12 can then move fore and aft along with the movement of the seat track 28, 30. The adjustment assembly 22 is preferably mounted between the seat pan and the upper track member 30 such that the adjustment assembly 22 can selectively move the seat pan upwardly above the seat track 28, 30. As will be appreciated, the adjustment assembly 22 may be mounted to other locations within the seat 10 such as between the seat track 28, 30 and seat riser 20.

As will become apparent from the foregoing detailed description, the adjustment assembly 22 of the subject invention is modular in design such that the adjustment assembly 22 may be mounted to any suitable part of the seat 10. In other words, the adjustment assembly 22 is independent of the seat cushion 12 itself and the seat track 28, 30 and does not interfere with the operations of the other components. An installer need only find a limited number of mounting points to install the adjustment assembly 22. The mounting points are found at the front 24 and rear 26 mounting brackets.

At least one front seat support 36 is movably mounted to the front mounting bracket 24 and adapted for mounting to the forward end 16 of the seat cushion 12. Similarly, at least one rear seat support 38 is movably mounted to the rear mounting bracket 26 and adapted for mounting to the rearward end 18 of the seat cushion 12. The front 36 and rear 38 seat supports are movable between a first position with the seat cushion 12 in a lowered orientation and a second position with the seat cushion 12 in a raised orientation. In the preferred embodiment, the at least one front seat support 36 includes a pair of front seat supports 36 and the at least one rear seat support 38 includes a pair of rear seat supports 38. As discussed above with reference to the mounting positions of the front 24 and rear 26 mounting brackets, the front 36 and rear 38 seat supports are therefore mounted to opposing sides of the seat cushion 12 and are adequately spaced apart.

As also discussed above, either or both of the front 36 and rear 38 seat supports may raise the seat cushion 12 either independently or in unison. For illustrative purposes, the embodiment shown in the Figures and discussed in detail hereinbelow discloses only the rear seat supports 38 moving the seat cushion 12 upward and downward. This embodiment is represented to illustrate the function of the adjustment assembly 22 as claimed. It is appreciated that a similar adjustment assembly may be also mounted to the front seat supports 36 either in conjunction with the rear seat supports 38 or in replacement thereof.

Accordingly, in the preferred embodiment, the front seat supports 36 operate independently of the rear seat supports 38 and only move in response to movement of the seat cushion 12. A link 39 interconnects each of the front mounting brackets 24 and the front seat supports 36 to provide adequate relative movement. The front seat supports 36 are directly mounted to the seat pan of the forward end 16 of the seat cushion 12. The front seat supports 36 move and pivot in response to any movement of the rearward end 18 of the seat cushion 12. As discussed below, the rear seat supports 38 create the movement of the seat pan and the rearward end 18 of the seat cushion 12.

At least one drive plate 40 interconnects one of the front 24 and rear 26 mounting brackets with a corresponding front 36 and rear 38 seat support. As discussed above, in the preferred embodiment, the drive plate 40 is pivotally mounted between one of the rear mounting brackets 26 and the corresponding rear seat support 38. Even more preferably, the at least one drive plate 40 includes a pair of drive plates 40 interconnecting each of the rear mounting brackets 26 to the corresponding rear seat supports 38. A connecting rod 42 interconnects each of the drive plates 40 on both sides of the seat cushion 12 such that each of the drive plates 40 and the rear seat supports 38 move upward and downward in unison.

A drive arm 44, having first 46 and second 48 ends, has the first end 46 mounted to one of the drive plates 40 and is movable between actuated and non-actuated positions for moving the corresponding front 36 and rear 38 seat support between the first and second positions to move the seat cushion 12 between the lowered and raised orientations. Again, as discussed with reference to the preferred embodiment, the corresponding front 36 and rear 38 seat support is the rear seat support 38. As shown, there is a single drive arm 44 mounted to one of the drive plates 40 on either the inboard or outboard side of the seat cushion 12. As appreciated, there may be a pair of drive arms 44, with one mounted to each drive plate 40, without deviating from the scope of the subject invention. Each drive plate 40, and corresponding drive arm 44 if utilized, operate in substantially the same manner. Accordingly, only one drive plate 40 and drive arm 44 will be discussed in greater detail hereinbelow.

Referring to FIGS. 3 through 6, the drive plate 40 includes a first pivot pin 50 rotatably mounting the drive plate 40 to the rear mounting bracket 26 and limiting the movement of the drive arm 44 toward at least one of the positions. Specifically, movement of the drive arm 44 toward the non-actuated position rotates the drive plate 40 about the first pivot pin 50 and moves the rear seat support 38 toward the first position for lowering the seat cushion 12 until the drive arm 44 engages the first pivot pin 50 extending from the rear mounting bracket 26. Accordingly, the first pivot pin 50 acts as a positive stop for the downward movement of the seat cushion 12. Preferably, the first pivot pin 50 is an integral extension of the connecting rod 42. As appreciated, the first pivot pin 50 and rod 42 may be separable parts which may or may not mount to the same location on the drive plate 40.

The drive plate 40 further includes a second pivot pin 52 rotatably mounting the drive plate 40 to the rear seat support 38 and moveable between a first position disposed below the first pivot pin 50 and a second position disposed above the first pivot pin 50. The drive plate 40 further includes a third pivot pin 54 rotatably mounting the drive plate 40 to the drive arm 44 with the third pivot pin 54 remaining below the first 50 and second 52 pivot pins during the movement of the seat cushion. The relative location and movement of the pivot pins 50, 52, 54 will be discussed in greater detail with reference to the operation section below. The first 50, second 52 and third 54 pivot pins are preferably configured in a substantially triangular configuration.

A cam 56 is connected to the second end 48 of the drive arm 44 for selectively moving the drive arm 44 between the actuated and non-actuated positions to move the front 36 and rear 38 seat supports and the seat cushion 12. The cam 56 is preferably a sector gear 56 pivotally mounted to the second end 48 of the drive arm 44.

A drive mount 58 is also mounted to the upper track 30 of the seat track 28, 30 preferably in-between the front 24 and rear 26 mounting brackets. The drive mount 58 has a shank 60 interconnecting the mount 58 to the sector gear 56 for rotatably supporting the sector gear 56 to the mount 58 and limiting the movement of the drive arm 44 toward at least one of the positions. Specifically, movement of the drive arm 44 toward the actuated position rotates the drive plate 40 about the first pivot pin 50 and moves the rear seat support 38 toward the second position for raising the seat cushion 12 until the drive arm 44 engages the shank 60 of the drive mount 58. Accordingly, the shank 60 acts as a positive stop for the upward movement of the seat cushion 12.

As shown in the Figures and most clearly in FIG. 4, a drive mechanism 62 is mounted to the drive mount 58 and has an input shaft 64 with a sprocket gear 66 in coupling relationship with the sector gear 56 for providing the pivotal movement to the sector gear 56. The shaft 64 and sprocket 66 are preferably part of a manual drive mechanism 62. The manual drive mechanism 62 has a hand actuator (not shown) mounted to a clutch (not numbered). As appreciated the manual drive mechanism 62 may be of any suitable configuration and could be replaced by a power drive mechanism of any suitable design.

As shown best in FIGS. 2, 3, 5 and 6, the sector gear 56 includes a plurality of teeth 70 with an oversized outer tooth 72 at each perimeter of the sector gear 56 such that the sprocket 66 cannot uncouple from the sector gear 56. This creates an additional pair of stops which operate in conjunction with the above mentioned stops, i.e., the shank 60 and the first pivot pin 50.

A return spring 74 is interconnected between one of the front mounting brackets 24 and one of the drive plates 40 for continuously biasing the corresponding drive plate 40 and the drive arm 44 toward the actuated position. Hence, the return spring 74 assists in raising the rearward end 18 of the seat cushion 12. The return spring 74 is preferably mounted to the opposite side of the seat cushion 12 from the sector gear 56.

Figure 5:
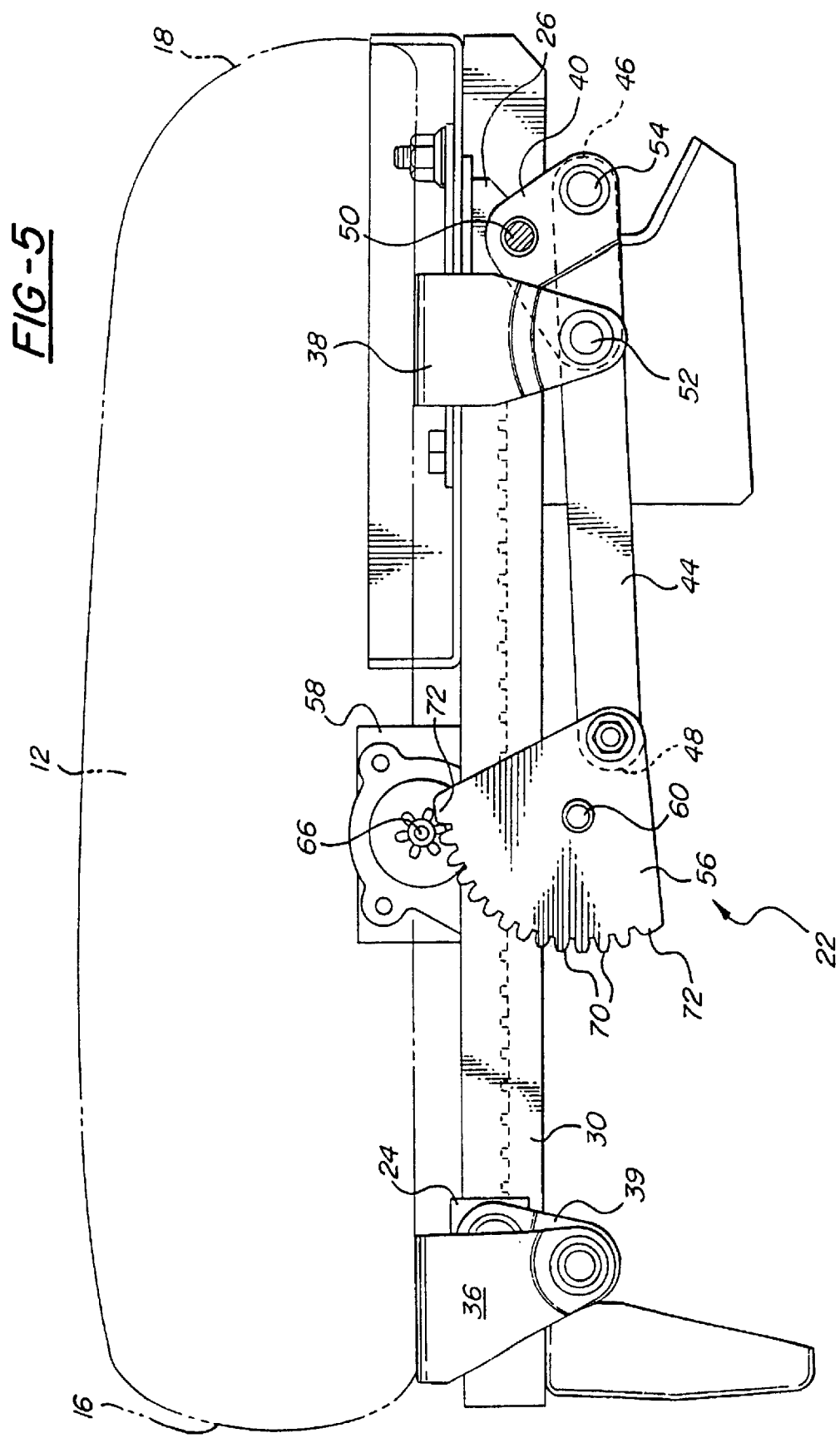
FIG. 5 is a partially cross-sectional side view of the adjustment assembly mounted to a seat track of the seat with the adjustment assembly in a lowered position.

As best shown in FIGS. 5 and 6, the movement of the sprocket 66 changes the position of the rearward end 18 of the seat cushion 12 between the lowered position and the raised position. When the sector gear 56 is in the first position (FIG. 5) the drive arm 44 is extended toward the rearward end 18 of the seat cushion 12 which pivots the drive plate 40 downward. As discussed above, the connecting rod 42 interconnects each of the drive plates 40 such that both of the drive plates 40 and rear seat supports 38 move in unison which equally lifts both sides of the seat cushion 12. As also discussed above, the movement of the sector gear 56 to the first position and the rearward movement of the drive plates 40 are limited by the first pivot pins 50. The movement of the sector gear 56 to the first position is also limited by the oversized outer tooth 72 on perimeter of the sector gear 56. The sprocket gear 66 cannot move beyond the oversized tooth 72. These measures help ensure that the sprocket 66 will not disengage from the sector gear 56 and that the seat cushion 12 will maintain a minimum desired height. The downward movement of the drive plates 40 pulls the rear seat supports 38 downward along with the seat pan and rearward end 18 of the seat cushion 12. Similarly, the front seat supports 36 move downward as shown in response to any movement of the forward end 16 of the seat cushion 12.

The sector gear 56 may then be actuated, via the sprocket 66, to the second position (FIG. 6) which pulls the drive plate 40 toward the forward end 16 of the seat cushion 12. Again, the connecting rod 42 ensures that both of the drive plates 40 move in unison. The movement of the sector gear 56 to the second position is limited by the engagement of the drive arm 44 with the shank 60 of the drive mount 58. The movement of the sector gear 56 to the second position is also limited by the opposing oversized tooth 72 on perimeter of the sector gear 56. The drive arm 44 pulls on the corresponding drive plate 40 which pivots the drive plates 40 upwardly. This in turn pushes the rear seat supports 38 upward along with the seat pan and the rearward end 18 of the seat cushion 12. The front seat supports 36 will move, upward, downward, forward, or rearward, as necessary in response to the movement of the forward end 16 of the seat cushion 12. As shown in FIG. 2, the return spring 74 is provided to assist in moving the rearward end 18 of the seat cushion 12 upward.

As can be appreciated and as discussed above, the front seat supports 36 could be connected to the sector gear 56 in a similar manner as the rear seat supports 38. In other words, one of the links 39 could be replaced with a similar drive plate 40 and a similar drive arm 44 could interconnect the drive plate 40 of the corresponding front seat support 36 to the sector gear 56. In addition a similar connecting rod 42 could be used to interconnect the two front seat supports 36 together. Further, a second drive mount, drive mechanism and sprocket could be included to move a second sector gear. Hence, the front 36 and rear 38 seat supports could move upwardly and downwardly together in a parallel lifting fashion to uniformly lift the forward 16 and rearward 18 ends of the seat cushion 12. Further, the drive arm 44 interconnecting the rear drive plate 40 could be eliminated such that only the forward end 16 of the seat cushion 12 could be actuated.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. An automotive seat adjustment assembly (22) adapted for adjusting a relative position of a seat cushion (12), said adjustment assembly (22) comprising:

at least one front mounting bracket (24) adapted for supporting a forward end (16) of the seat cushion (12), at least one rear mounting bracket (26) adapted for supporting a rearward end (18) of the seat cushion (12), at least one front seat support (36) movably mounted to said front mounting bracket (24) and adapted for mounting to the forward end (16) of the seat cushion (12), said front seat support (36) movable between a first position with the seat cushion (12) in a lowered orientation and a second position with the seat cushion (12) in a raised orientation, at least one rear seat support (38) movably mounted to said rear mounting bracket (26) and adapted for mounting to the rearward end (18) of the seat cushion (12), said rear seat support (38) movable between a first position with the seat cushion (12) in a lowered orientation and a second position with the seat cushion (12) in a raised orientation, at least one drive plate (40) including a first pivot pin (50) rotatably mounting said drive plate (40) to one of said front (24) and rear (26) mounting brackets to interconnect one of said front (24) and rear (26) mounting brackets with a corresponding front (36) and rear (38) seat support, a drive arm (44) having first (46) and second (48) ends with said first end (46) mounted to said drive plate (40) and movable between actuated and non-actuated positions for moving said corresponding front (36) and rear (38) seat support between said first and second positions to move the seat cushion (12) between said lowered and raised orientations, a shank (60) extending from said seat adjustment assembly (22), and a cam (56) rotatably connected to said shank (60) and connected to said second end (48) of said drive arm (44) for selectively moving said drive arm (44) between said actuated and non-actuated positions to move said front (36) and rear (38) seat supports and the seat cushion (12), said assembly (22) characterized by said cam being arranged and configured such that movement of said drive arm (44) toward said actuated position rotates said drive plate (40) about said first pivot pin (50) and moves said corresponding front (36) and rear (38) seat support toward one of said first and second positions until said drive arm (44) engages said shank (60) to prevent further movement thereof, and said drive plate (40) being arranged and configured such that movement of said drive arm (44) toward said non-actuated position rotates said drive plate (40) about said first pivot pin (50) and moves said corresponding front (36) and rear (38) seat support toward the other of said first and second positions until said drive arm (44) engages said first pivot pin (50) extending from one of said front (24) and rear (26) mounting brackets to prevent further movement thereof, thereby defining a pair of positive stops for the upward and downward movement of the seat cushion (12).

2. An assembly as set forth in claim 1 wherein said cam (56) is a sector gear (56) pivotally mounted to said second end (48) of said drive arm (44).

3. An assembly as set forth in claim 2 further including a drive mount (58) having said shank (60) interconnecting said mount (58) to said sector gear (56) for rotatably supporting said sector gear (56) to said mount (58) and limiting said movement of said drive arm (44) toward at least one of said positions.

4. An assembly as set forth in claim 3 further including a drive mechanism (62) mounted to said drive mount (58) and having an input shaft (64) with a sprocket gear (66) in coupling relationship with said sector gear (56) for providing said pivotal movement to said sector gear (56).

5. An assembly as set forth in claim 4 wherein said sector gear (56) includes a plurality of teeth (70) with an oversized outer tooth (72) at each end of said sector gear (56) such that said sprocket gear (66) cannot uncouple from said sector gear (56).

6. An assembly as set forth in claim 1 wherein said drive plate (40) further includes a second pivot pin (52) rotatably mounting said drive plate (40) to said corresponding front (36) and rear (38) seat support and moveable between a first position disposed below said first pivot pin (50) and a second position disposed above said first pivot pin (50).

7. An assembly as set forth in claim 6 wherein said drive plate (40) further includes a third pivot pin (54) rotatably mounting said drive plate (40) to said drive arm (44) with said third pivot pin (54) remaining below said first (50) and second (52) pivot pins.

8. An assembly as set forth in claim 7 further including a drive mount (58) having said shank (60) interconnecting said mount (58) to said cam (56) for rotatably supporting said cam (56) to said mount (58) and limiting said movement of said drive arm (44) toward at least one of said positions.

9. An assembly as set forth in claim 8 wherein said first (50), second (52) and third (54) pivot pins are configured in a substantially triangular configuration such that movement of said drive arm (44) toward said actuated position rotates said drive plate (40) about said first pivot pin (50) and moves said corresponding front (36) and rear (38) seat support toward said second position for raising the seat cushion (12) until said drive arm (44) engages said shank (60) of said drive mount (58) and movement of said drive arm (44) toward said non-actuated position rotates said drive plate (40) about said first pivot pin (50) and moves said corresponding front (36) and rear (38) seat support toward said first position for lowering the seat cushion (12) until said drive arm (44) engages said first pivot pin (50) extending from one of said front (24) and rear (26) mounting brackets.

10. An assembly as set forth in claim 9 wherein said drive plate (40) is pivotally mounted between said rear mounting bracket (26) and said rear seat support (38).

11. An assembly as set forth in claim 7 wherein said at least one front mounting bracket (24) includes a pair of front mounting brackets (24) and said at least one rear mounting bracket (26) includes a pair of rear mounting brackets (26).

12. An assembly as set forth in claim 11 further including a seat track mechanism (28, 30) with said pairs of front (24) and rear (26) mounting brackets being mounted thereto.

13. An assembly as set forth in claim 11 wherein said at least one front seat support (36) includes a pair of front seat supports (36) and said at least one rear seat support (38) includes a pair of rear seat supports (38).

14. An assembly as set forth in claim 13 further including a link (39) interconnecting each of said front mounting brackets (24) and said front seat supports (36).

15. An assembly as set forth in claim 14 wherein said at least one drive plate (40) includes a pair of drive plates (40) interconnecting each of said rear mounting brackets (26) to said rear seat supports (38).

16. An assembly as set forth in claim 15 further including a connecting rod (42) interconnecting each of said drive plates (40) such that each of said drive plates (40) and said rear seat supports (38) move upward and downward in unison.

17. An assembly as set forth in claim 16 further including a return spring (74) interconnected between one of said front mounting brackets (24) and one of said drive plates (40) for continuously biasing said corresponding drive plate (40) and said drive arm (44) toward said actuated position to assist in said raising of the seat cushion (12).

* * * * *

UNITED STATES PATENT AND TRADEMARK OFFICE
CERTIFICATE OF CORRECTION

PATENT NO.     : 6,488,337 B1
DATED          : December 3, 2002
INVENTOR(S)    : De Voss et al.

It is certified that error appears in the above-identified patent and that said Letters Patent is hereby corrected as shown below:

<u>Column 1,</u>
Line 17, please delete "for" and insert -- fore -- therefor.

<u>Column 2</u>
Line 55, please delete "rear" and insert -- rearward -- therefor.

<u>Column 4,</u>
Line 51, please delete "operate" and insert -- operates -- therefor.

Signed and Sealed this

Eleventh Day of March, 2003

JAMES E. ROGAN
*Director of the United States Patent and Trademark Office*